(12) United States Patent
Takemura

(10) Patent No.: US 8,797,593 B2
(45) Date of Patent: Aug. 5, 2014

(54) IMAGE PROCESSING APPARATUS AND IMAGE PROCESSING METHOD

(75) Inventor: Hideki Takemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 13/330,651

(22) Filed: Dec. 19, 2011

(65) Prior Publication Data

US 2012/0170063 A1    Jul. 5, 2012

(30) Foreign Application Priority Data

Jan. 5, 2011   (JP) ................. 2011-000629

(51) Int. Cl.
  *G06F 15/00*   (2006.01)
  *G06K 1/00*   (2006.01)

(52) U.S. Cl.
  USPC ........................................... 358/1.9

(58) Field of Classification Search
  USPC .......................................... 358/1.9, 518, 523
  See application file for complete search history.

(56) References Cited

U.S. PATENT DOCUMENTS

| 2004/0021882 A1* | 2/2004 | Kakutani | ........... 358/1.9 |
| 2008/0297818 A1* | 12/2008 | Shimbaru | ........... 358/1.9 |
| 2010/0265527 A1* | 10/2010 | Tsuchiya | ........... 358/1.9 |

FOREIGN PATENT DOCUMENTS

JP    2007-208619    8/2007

* cited by examiner

*Primary Examiner* — Mark Zimmerman
*Assistant Examiner* — Michael Burleson
(74) *Attorney, Agent, or Firm* — Fitzpatrick, Cella, Harper & Scinto

(57) ABSTRACT

Obtaining a color correction value of an input image data color signal by referencing a lookup table according to the color signal, obtaining a color correction value of a color signal by performing an interpolation calculation with respect to 2 color correction values obtained by referencing the lookup table, determining whether the input image data color signal is a specified value, and outputting the specified value as the color correction value without performance of the interpolation calculation in the case where it is determined that the input image data color signal is the specified value.

9 Claims, 16 Drawing Sheets

| INPUT DATA | OUTPUT DATA |
|---|---|
| INDATA = K<br>(INDATA = 0, 1, ... , 255)<br>(K = 0, 1, 2, ... , 255) | T[K] |

FIG.9A

| INPUT DATA | OUTPUT DATA |
|---|---|
| INDATA = 4 * K + R<br>(INDATA = 0, 1, 2, ... , 1023)<br>(K = 0, 1, 2, ... , 255)<br>(R = 0, 1, 2, 3) | $\frac{(4 - R) * T[K] + R * T[K+1]}{4}$<br>(ROUND-OFF TO CLOSEST WHOLE NUMBER) |

FIG.9B

| INPUT DATA | OUTPUT DATA |
|---|---|
| INDATA = 16 * K + R<br>(INDATA = 0, 1, 2, ... , 4095)<br>(K = 0, 1, 2, ... , 255)<br>(R = 0, 1, 2, ... , 15) | $\frac{(16 - R) * T[K] + R * T[K+1]}{16}$<br>(ROUND-OFF TO CLOSEST WHOLE NUMBER) |

FIG.9C

| INPUT DATA | OUTPUT DATA |
|---|---|
| INDATA = 256 * K + R<br>(INDATA = 0, 1, 2, ... , 65535)<br>(K = 0, 1, 2, ... , 255)<br>(R = 0, 1, 2, ... , 255) | $\frac{(256 - R) * T[K] + R * T[K+1]}{256}$<br>(ROUND-OFF TO CLOSEST WHOLE NUMBER) |

FIG.9D

| INPUT DATA | OUTPUT DATA |
|---|---|
| INDATA = K<br>(INDATA = 0, 1, ... , 255)<br>(K = 0, 1, 2, ... , 255) | T[K] |

FIG.14A

| INPUT DATA | OUTPUT DATA |
|---|---|
| INDATA = 4 * K + R<br>(INDATA = 0, 1, 2, ... , 1023)<br>(K = 0, 1, 2, ... , 255)<br>(R = 0, 1, 2, 3) | $$\frac{(3 - R) * T[K] + (1 + R) * T[K+1]}{4}$$ (ROUND-OFF TO CLOSEST WHOLE NUMBER) |

FIG.14B

| INPUT DATA | OUTPUT DATA |
|---|---|
| INDATA = 16 * K + R<br>(INDATA = 0, 1, 2, ... , 4095)<br>(K = 0, 1, 2, ... , 255)<br>(R = 0, 1, 2, ... , 15) | $$\frac{(15 - R) * T[K] + (1 + R) * T[K+1]}{16}$$ (ROUND-OFF TO CLOSEST WHOLE NUMBER) |

FIG.14C

| INPUT DATA | OUTPUT DATA |
|---|---|
| INDATA = 256 * K + R<br>(INDATA = 0, 1, 2, ... , 65535)<br>(K = 0, 1, 2, ... , 255)<br>(R = 0, 1, 2, ... , 255) | $$\frac{(255 - R) * T[K] + (1 + R) * T[K+1]}{256}$$ (ROUND-OFF TO CLOSEST WHOLE NUMBER) |

FIG.14D

IMAGE PROCESSING APPARATUS AND IMAGE PROCESSING METHOD

BACKGROUND OF THE INVENTION

1. Field of the Invention

The invention relates to an image processing apparatus and an image processing method, and in particular to a structure that performs color correction processing to color signals included in input image data.

2. Description of the Related Art

It is known in the prior art, as a color correction process, to perform a gamma correction process, for example, that corrects image data according to print density characteristics or color reproduction characteristics, which are exerted by a printing apparatus. As for these types of correction processes, it is possible to obtain corrected image data by performing an interpolation calculation to values obtained by referencing a lookup table.

An example of the above kind of color correction is disclosed in Japanese Patent Laid-Open No. 2007-208619. More specifically, Japanese Patent Laid-Open No. 2007-208619 discloses performing gradation correction using an expanded lookup table that is made by interpolating between two grid points of an underlying base lookup table.

However, in the conventional correction process that uses the above described lookup tables and the interpolation calculation, there may be a case where the intended specified value can not be obtained as an output value. For example, in the case of performing a gamma correction process while using a 1D lookup table and an interpolation calculation for table value, there are a case where it is intended to output a specified value for a maximum gradation value or a maximum density value of input image data. However, in the conventional processes, with respect to the maximum gradation value, an interpolation calculation is performed to table values based on the maximum gradation value, and a result is output. For this reason, there may be a case that the result of the interpolation does not match the specified value, and the intended specified value can not be obtained as an output value. As a result, for example, unnecessary dots of a color printing material such as ink are formed at white areas where dots are not to be printed, and dot missing is caused on a solid-image region where dots of the color printing material should be formed on the entire area.

SUMMARY OF THE INVENTION

One aspect of the present invention is to provide an image processing apparatus and an image processing method that are capable of outputting a specified value as the color correction value without performing an interpolation calculation, in the case that the color signal value of the input image data is the specified value, when performing a color correction using a lookup table and a interpolation calculation.

In one aspect of the present invention, there is provided an image processing apparatus, comprising: an interpolation unit configured to perform an interpolation calculation to two color correction values that are obtained by referencing a lookup table according to a color signal of an input image data to obtain the color correction value of the color signal of the input image data; a determination unit configured to determine whether the color signal of the input image data is a specified value; and an output unit configured to output the color correction value obtained by referencing the lookup table and the color correction value obtained by the interpolation calculation by the interpolation unit, wherein the output unit outputs the specified value as the color correction value without performance of the interpolation calculation by the interpolation calculation unit, in the case that it is determined by the determination unit that the color signal of the input image data is the specified value.

Further features of the present invention will become apparent from the following description of exemplary embodiments (with reference to the attached drawings).

BRIEF DESCRIPTION OF THE DRAWINGS

FIGS. 9A to 9D are diagrams that explain the linear interpolation calculation by the linear interpolation calculation part shown at FIG. 7;

FIGS. 14A to 14D are diagrams that explain the second linear interpolation calculation by the linear interpolation calculation part of Embodiment 3 of the invention;

DESCRIPTION OF THE EMBODIMENTS

Figure 1:
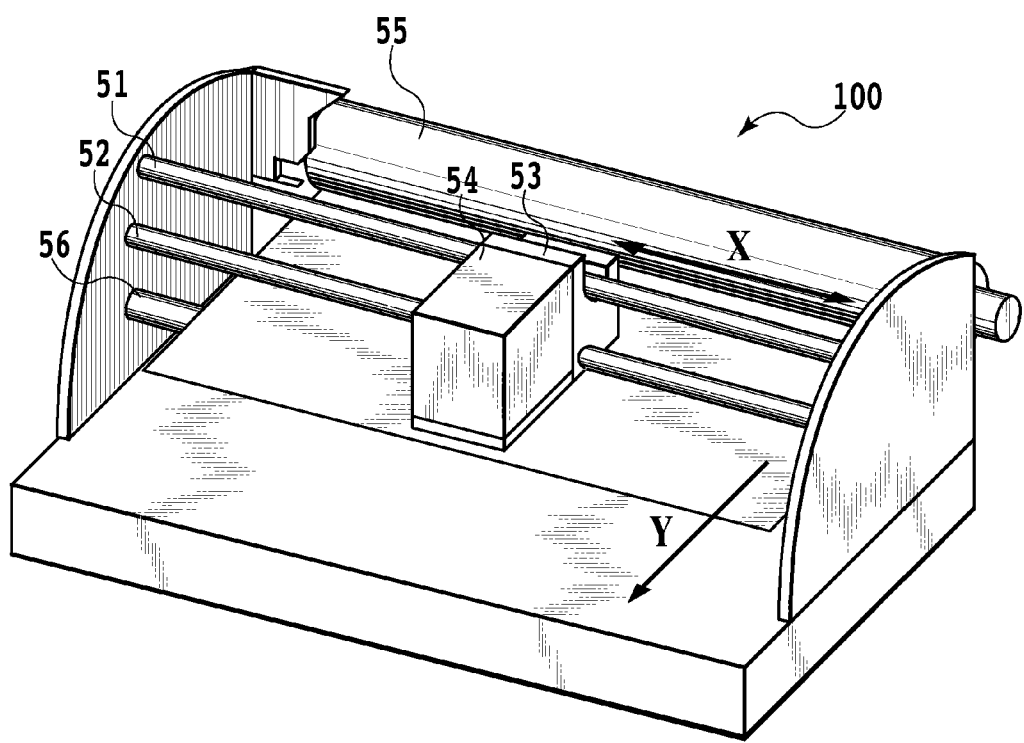
FIG. 1 is a perspective view that illustrates the skeleton framework of the printing apparatus of Embodiment 1.

Embodiments of the invention will be described below while referring to the drawings.

Embodiment 1

FIG. 1 is a perspective view that illustrates the skeleton framework of the printing apparatus of Embodiment 1. The printing apparatus 100 of this embodiment is a serial scan type printing apparatus that performs printing by scanning an ink jet type print head with respect to a print medium such as paper. That is, the carriage 53, on which the print head is mounted, is guided such that moves freely along the guide rails 51 and 52, along the main scanning direction denoted by arrows marked X in the figure. The carriage 53 can be operated back and forth along the guide rails by a driving force transmission mechanism, such as a carriage motor and an endless belt that transmits its driving force. A print head (not shown) and ink tanks 54 of each color are mounted in the carriage 53. Provided on the print head are ejection port arrays that have multiple ejection ports for ejecting ink aligned in a direction that crosses the main scanning direction. It is possible to use an electro-thermal conversion element (heater) or a piezoelectric element that uses the piezoelectric effect, for example, as mechanisms for ejecting ink from the ejection ports. In the case where an electro-thermal conversion element is used, ink bubbles are generated by the heat generated from the electro-thermal conversion element, and ink is ejected from the ejection ports using the bubble energy generated upon bubble formation.

Paper that has been wound into a roll-shaped paper roll 55 mounted on the printing apparatus 100 is used as a printing medium, and the paper sheet that has been drawn out from the paper roll 55 is inserted into the insertion port of the printing apparatus. Next, the paper sheet is conveyed by the conveyance roller 56 in the sub-scanning direction (shown by the Y arrow of the figure), which is perpendicular to the main scanning direction.

The printing apparatus 100 repeats printing operations in which ink is ejected from the print head towards the print region of the paper sheet while the print head is scanned back and forth along the main scanning direction, and conveyance operations in which the paper sheet is conveyed in the sub-scanning direction only a distance corresponding to the printing width of the print head. Accordingly it is possible to sequentially print an image on the paper sheet.

The printing apparatus 100 is capable of printing at a maximum width of 60 inches and can print images on the paper sheet using the 12 ink colors listed next. That is, the print head is provided with respective ejection port arrays for ejecting 12 colors of ink: cyan, photo-cyan (light cyan), magenta, photo-magenta (light magenta), yellow, red, green, blue, black, matte-black, grey, and photo-grey (light grey).

Figure 2:
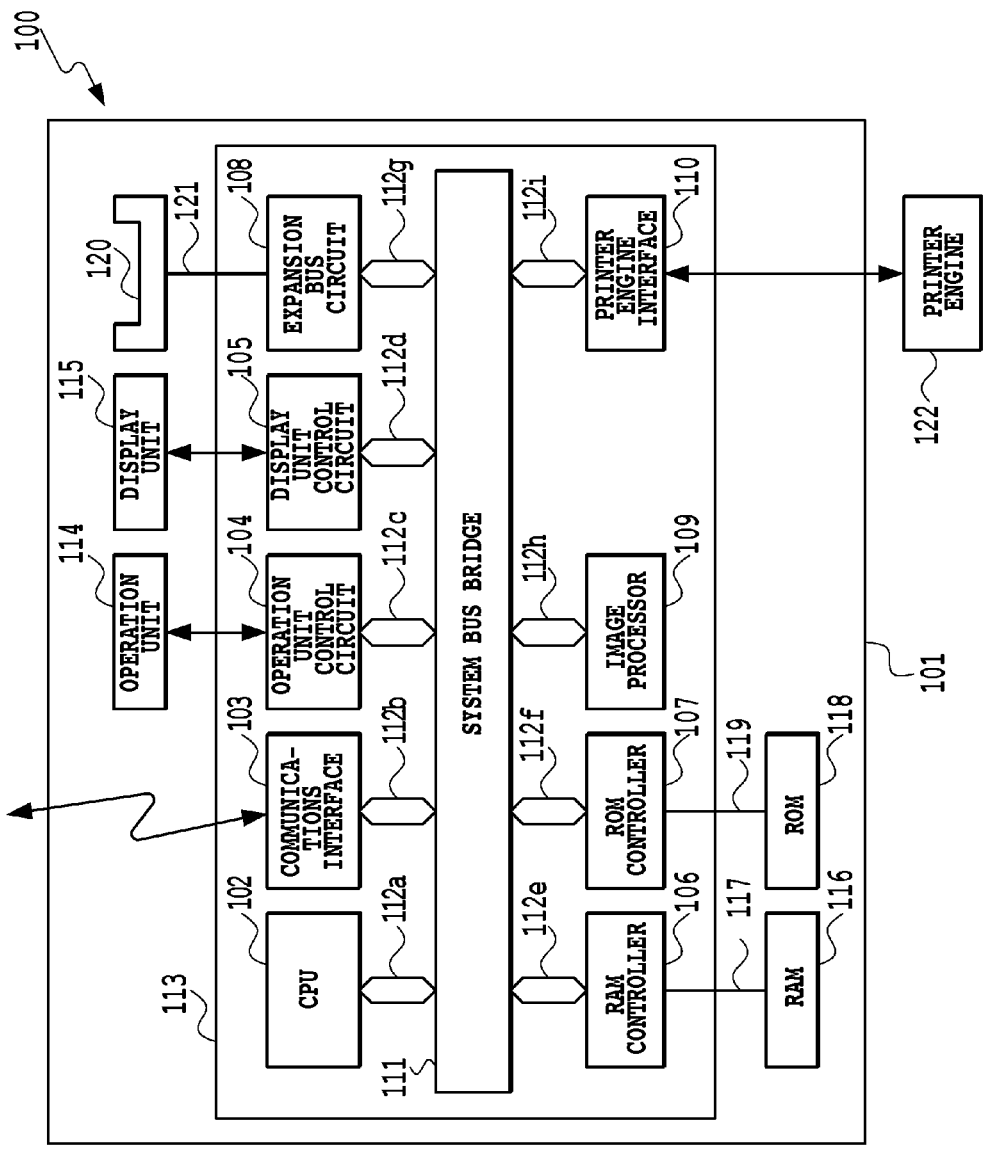
FIG. 2 is a block diagram that illustrates the structure for data processing and control of the printing apparatus shown at FIG. 1.

FIG. 2 is a block diagram that illustrates the structure for data processing and control of the printing apparatus 100 shown at FIG. 1. As shown at FIG. 2, the printing apparatus 100 is configured to have a printer engine 122 that performs the printing operations explained at FIG. 1, an image formation controller 101, and a power supply circuit, etc. (not shown).

The image formation controller receives printing instructions and print image data from a host device such as a personal computer (PC), and outputs the received image data after converting it to binary print data that can be used at the printer engine 122. The image formation controller 101 is provided with a CPU 102, a communications interface 103, an operating unit control circuit 104, a display unit control circuit 105, a RAM controller 106, a ROM controller 107, an expansion bus circuit 108, an image processor 109, and a printer engine interface 110. Each of the above parts connects to the system bus bridge 111 through respective bus lines 112a to 112i. In this embodiment the processing part o controllers are implemented as an image formation controller ASIC (Application Specific Integrated Circuit) encapsulated as a single System LSI package.

The image formation controller 101 also has an operation unit 114, a display unit 115, a RAM 116, a ROM 118 and an expansion slot 120 that mounts a function enhancement part.

The CPU 102 implements color correction processing such as that described later at FIG. 7 and thereafter, and all of the processes and control of the image formation controller 101. That is, the CPU 102, by sequentially reading and executing programs indicative of the control procedures and stored in the ROM 118 or the RAM 116, performs control of the communications interface 103, the operation unit 114 and the display unit 115. The CPU 102 also performs control of the image processor 109 for converting received image data into print data used at the print engine 122, and control of the printer engine interface 110 for transferring generated image formation data to the printer engine 122.

The communications interface 103 has a function that performs data transmission and reception between a host device such as a personal computer, and stores image data received from the host device in the RAM 116 via the RAM controller 106. The transmission method of the communications interface 103 may take the form of high speed serial communications such as USB (Universal Serial Bus) or IEEE 1394, parallel communications such as IEEE 1284, or network communications such as 100Base-TX or 1000 Base-T. It is also permissible to have multiple transmission methods. Furthermore, the transmission method is not limited to wired transmission methods; wireless transmission methods may also be employed.

With respect to the read command from the CPU 102, the operation unit control circuit 104 notifies the CPU of the status of the electric signal output according to the operation of the switch provided on the operation unit 114, as register information. The operation unit control circuit 104 also generates an interrupt signal with respect to the CPU 102 when a change occurs in the state of the electric signal output from the switch. The display unit control circuit 105 outputs an electric signal to the liquid crystal display apparatus and LED lamp that comprise the display unit 115.

The RAM controller 106 performs control of the RAM 116 connected to the image formation controller ASIC113 via the RAMbus 117. The RAM controller 106 performs the relay of written and read data between the CPU 102 and the each of the parts having DMAC, and the RAM 116. The RAM controller 106 generates necessary control signals in response to read requests and write requests from the CPU 102 and each unit, and implements it being read into and read out of the RAM 116. The ROM controller 107 performs control of the ROM 118 connected to the image formation controller ASIC113 via the ROM bus 119. The ROM controller 107 generates necessary control signals in response to read requests from the CPU 102, reads out control procedure programs and data stored in advance in the ROM 118, and returns the read out content to the CPU 102 via the system bus bridge 111. In the case where the ROM 118 comprises a device capable of being electrically rewritten, such as flash memory, the ROM controller 110 generates necessary control signals and rewrites the contents of the ROM 118.

The expansion bus circuit 108 controls a function expansion unit mounted in the expansion slot 120, and performs control of data being transmitted through the expansion bus 121 to the function expansion part, and performs control for receiving data sent by the function expansion part. As for the expansion slot 120, in addition to a hard disk drive unit that provides large capacity storage capability, a USB or an IEEE1394, it is also possible to mount a communications part that carries out communications with the host device based on a communications facility based on IEEE1284, etc.

The image processor 109 converts the image data received from the host device to binary print data that can be used at the printer engine 122. Note that the details of the processes of the image processor 109 will be described while making reference to FIG. 3 and the figures thereafter.

The printer engine interface 110 performs data transfer between the image formation controller 101 and the printer engine 122. That is, the printer engine interface 110 has a DMAC (Direct Memory Access Controller). Hence the printer engine interface 110 is capable of sequentially reading out, through the RAM controller 106, and sending, to the printer engine 122, binary print data generated at the image processor 109 and stored in the RAM 116. Note that the image processor 109, the communications interface 103, and the expansion bus circuit 108, similarly to the printer engine interface 110, have a DMAC facility, and are provided with a facility to produce memory access requests.

The system bus bridge 111, in addition to connecting between each of the units comprising the image formation controller ASIC113, in the case where access requests are produced at the same time from multiple blocks, is provided with a facility that adjusts bus rights. In the case where the CPU 102 and each of the parts having a DMAC create a request to access the RAM 116 through the RAM controller 106 at approximately the same time, the system bus bridge 111 performs appropriate adjustments according to priorities that have been designated in advance.

The operation unit 114 comprises switches that are coupled to buttons that sets the operation of the printing apparatus 100, and outputs the status of this switch as an electric signal. The operation unit 114 also outputs as an electric signal a change in the status of the switch due to manipulation of the operation button. The operation unit 114 is also provided with a power button that directs the power of the printing apparatus 100 on and off. Furthermore, the operation unit 114 is provided with an online button that switches the operating mode, menu buttons that direct display of the menu screen, an up-down, left-right arrow pad for selecting items from the menu screen, and an OK button for confirming selected items. Aside from this, the controller 114 is provided with a stop button that directs printing to stop, and a paper feed selection button for selecting the method of feeding the paper for printing.

The display unit 115 comprises a liquid crystal display device and a LED lamp, etc. The liquid crystal display device, in addition to displaying the operating state of the printing apparatus 100, displays a menu screen upon operation of a menu button of the operating unit 114, etc. The LED lamp performs the display of the operating state of the printing apparatus 100, and performs the display of warnings.

The RAM 116 comprises Synchronous DRAM and is a memory that provides functions such as storing control procedure programs executed by the CPU 102, temporary storage of image formation data generated at the image processor 109, and providing a working memory for the CPU 102. The RAM 116 also performs temporary buffering of image data that the communications interface 103 has received from the host device, and performs the temporary storage of data transmitted between the function enhancement units that are connected via the expansion bus 121. The ROM 118 comprises flash memory, etc., and stores control procedure programs executed by the CPU 102 and parameters necessary for printer control. Flash memory is non-volatile memory capable of being electronically rewritten, and is capable of rewriting control procedure programs and parameters by following a prescribed sequence.

The printer engine 122 is mainly configured as shown at FIG. 1, and prints images on a print medium based on binary print data sent from the image formation controller 101. In this embodiment the printer engine 122 forms images on a sheet of paper by way of a ink jet type print head as described above, and is capable of printing images using 12 colors of ink, at a maximum width of 60 inches and a resolution of 1200 dpi (dots per inch).

Figure 3:
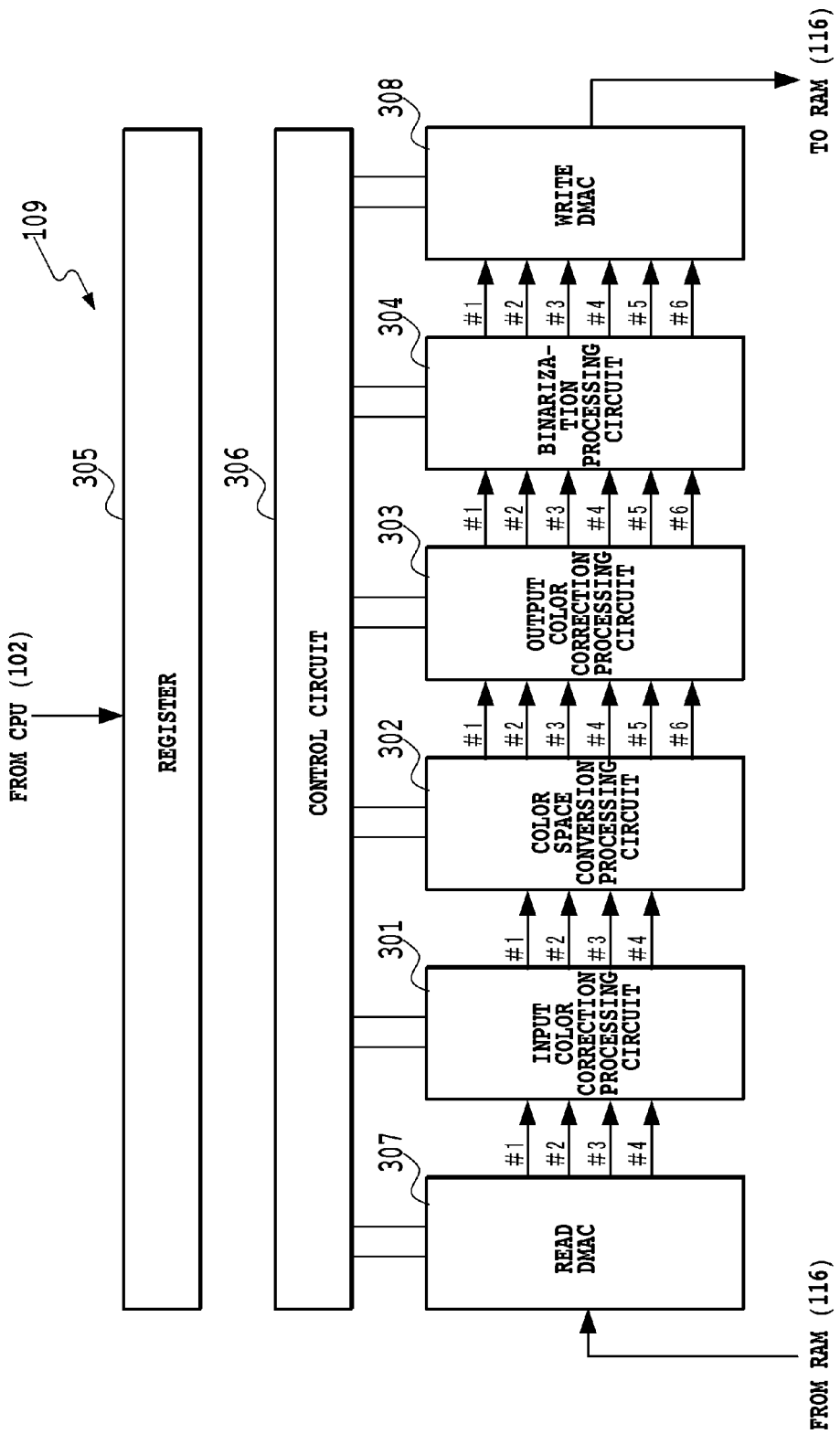
FIG. 3 is a block diagram that illustrates the detailed configuration of the image processor shown at FIG. 2.

FIG. 3 is a block diagram that illustrates the detailed configuration of the image processor 109 shown at FIG. 2. As shown at FIG. 3, the image processor 109 has an input-color correction processing circuit 301, a color-space conversion processing circuit 302, an output-color correction processing circuit 303, a binarization processing circuit 304, a register 305, and a control circuit 306. The image processor 109 also has an image data reader DMAC 307 that reads out image data stored in the RAM 116, and an image data writer DMAC 308 that writes into the RAM 116 the print data obtained via binarization processing.

The input-color correction processing circuit 301 performs input gamma correction processing to image data received from the host device, based on a one dimensional (1D) lookup table and linear interpolation. In this embodiment the input-color correction processing circuit 301 can simultaneously perform input gamma correction processing with respect to a maximum of 4 colors of image data. The input-color correction processing circuit 301 also has a function for outputting input data as it is, that is, without executing input gamma correction processing. That is, the input-color correction processing circuit 301 can selectively switch between executing input gamma correction processing and not executing the processing, according the content set in a predetermined field provided in the image processing operation mode register of the register 305.

The color-space conversion processing circuit 302 converts image data expressed by three or four color signals into image data expressed by a maximum of six color signals corresponding to the ink colors used in the printer engine 122, by way of employing a three dimensional or four dimensional lookup table and an (hyper) tetrahedron interpolation. The color-space conversion processing circuit 302 similarly also has a function for outputting data as it is, that is, without executing color-space conversion processing. That is, the color-space conversion processing circuit 302 selectively switches between executing color-space conversion processing and not executing the processing, according to the content set in a predetermined field provided in the image processing operation mode register 402 of the register 305.

The output-color correction processing part 303 performs output gamma correction processing with respect to image data output from the color-space conversion processing circuit 302, based on a 1D lookup table and a linear interpolation calculation. The output-color correction processing circuit 303 can simultaneously perform output gamma correction processing with respect to a maximum of 6 colors of image data. The output-color correction processing circuit 303 similarly also has a function for outputting data as it is, that is, without executing output gamma correction processing. That is, the output-color correction processing circuit 302 selectively switches between executing output gamma correction processing and not executing the processing, according to the content set in a predetermined field provided in the image processing operation mode register of the register 305. In the case of the output color correction processing circuit 303, when a value of "1" is set in the output color correction processing field of the image processing operation mode register output gamma correction processing is executed with respect to the input data. When a value of "0" has been set the input data is output as is without executing output gamma correction processing with respect to the input data. Note that the details of the output color correction processing circuit 303 will be described while making reference to FIG. 7 and the figures thereafter.

The output color correction processing circuit 303, in essence, performs output gamma correction processing to input image data by way of using a one dimensional lookup table and performing an interpolation calculation with respect to the table values. In this embodiment the output-color correction processing circuit 303 can simultaneously perform the respective gamma corrections of 6 color signals among the color signals of the image data. The output color correction processing circuit 303 has a function for outputting data as it is, that is, without executing output gamma correction processing, according to the image processing mode or the printing mode. That is, the output color correction processing circuit 303 can selectively switch between executing output gamma correction processing and not executing the processing, according the content set in a predetermined field provided in the image processing operation mode register of the register 305. More concretely, when a value of "1" is set in the output color correction processing field of the image processing operation mode register output gamma correction processing is executed with respect to each of the color signals of the input image data, and in the case where a value of "0" is set the input image data is output as is. Also, as described later, as for the mode that uses only a portion of the inks among the inks that can be used by the printer engine 122, the output color correction processing circuit 303 has a function that is not a so-called gamma correction, but a 1D color conversion wherein one color signal is converted to a different color signal. In this case as well the conversion is performed using a lookup table and an interpolation calculation, and a color correction value is output as the result of the interpolation. Note that the detailed configuration and processing at the output color correction processing circuit 303 will be described while making reference to FIG. 7 and the figures thereafter.

The binarization processing circuit 304 performs binarization processing by way of an error diffusion method, with respect to each of the maximum of 6 color signals. More specifically, the binarization processing circuit 304 performs a quantization process, that is, performs a binarization process by comparing a predetermined threshold value to a value obtained by adding quantization error, diffused from the surrounding pixels, to the pixel value of the subject pixel of the process. The quantization error generated from the subject pixel is dispersed to the surrounding unprocessed pixels, and due to this the overall density of the image data is preserved.

The register 305 has a set of registers comprising an image processing activation register that instructs image processing to commence, and a command parameter register that specifies the contents of the executed image process and its parameters. The register 305 also has a output color correction processing mode register that governs the operation of the output color correction processing circuit 303.

The control circuit 306 executes overall control of the image processor 109 having each of the above described elements. For example, the control circuit 306 operates according to an activation instruction from the CPU 102, outputs control signals necessary for each of the functional elements inside the image processor 109 and necessary for the DMAC part according to parameters set in the register 305, and operates each of the elements of the output color correction processing circuit block 203, etc.

The read DMAC 307 reads out input image data stored in the RAM 116. The write DMAC 308 stores generated binary printing data in the RAM 116.

In this embodiment, the image data that is produced at the host device as the image data for the printing target is expressed as data consisting of 3 or 4 color signals or to color signals corresponding to the ink used at the printing apparatus 100. In the case where the image data at the host device consists of 3 color signals, each pixel is expressed as a red (R), green (G), or blue (B) color signal, and in the case of 4 color signals each pixel is expressed as a cyan (C), magenta (M), yellow (Y) or black (K) color signal. In either case, each color signal is expressed as 8 bit, 10 bit, 12 bit or 16 bit data. 3 or 4 color image data is converted by the color space conversion processing circuit 302 into image data consisting of ink color signals used at the printing apparatus 100. Because, as described above, the printing apparatus uses 12 colors of ink, in the case performing full color printing the data is converted to those corresponding 12 color signals. Note that in the case where the image data at the host device consists of ink color signals used at the printing apparatus 100, the image data at the host apparatus is input to the output color correction processing circuit 303 without the application of input color correction procession and without the application of color space conversion processing. Here, value of the input color correction processing field and the value of the color space conversion processing field at the register 305 are set to "0," that is, they are set to "do not execute."

The printing apparatus 100 has a printing mode that uses only some of the ink colors among the 12 ink colors. This printing mode, is a monochrome mode, for example, that among the 12 ink colors uses only black, matte-black, grey and photo-grey. When executing this monochrome mode, image data that is expressed as 3 color signals R, G, and B, for example, undergoes the following 1D color conversion at the output color correction processing circuit 303. That is, with respect to the color signal R, four 1D color conversions are defined, which convert it into respective black, matte-black, grey and photo-grey color signals, and each of the color conversions are executed using the lookup table described while making reference to FIG. 7 and the figures thereafter. The same process is carried out with respect to the color signals G and B, and respective black, matte-black, grey and photo-grey signals are output. Next, each of the output black, matte-black, grey and photo-grey color signals of the 3 R, G, and B color signals are combined, final black, matte-black, grey and photo-grey color signals are output. As for the above color conversion, a color signal of an additive mixture of colors is converted into a signal of a subtractive mixture of colors via a decreasing function type lookup table. When in this color mode, the value of the input color correction processing field and the value of the color space conversion processing field of the register 305 are set to "0," that is, they are set to "do not execute", and the input color correction process and the color space conversion process are bypassed.

The image data at the hose device is sent to the printing apparatus 100 via the communications interface 103, and stored in the RAM 116. When the CPU 102 writes a value of "1" in the image processing activation register in the register 305 of the image processor 109, and directs image processing to activate, the control circuit 306 commences operation. When the control circuit 306 instructs data transfer to the read DMAC 307 to begin, image data stored in the RAM 116 is sequentially read out, and each of the processes of the image processor 109 are successively executed as a pipeline process. The generated binary print data is written into the RAM 116 by the write DMAC 308. After that, by way of the CPU 102 activating the printer engine interface 101, the printer engine interface 110 reads out the binary print data from the RAM 116, transmits it to the printer engine 122, and an image is printed on the print medium by the printer engine 122.

The image processor 109 outputs binary print data for a maximum of 6 color signals in a single process. Because the printing apparatus 100 is capable of printing with a maximum of 12 colors of ink, in a mode that performs a printing operation using more than 6 colors of ink, the required number of binary print data is generated for each of the ink types in use, by way of activating the image processor 109 twice with respect to the same input image data.

The data transfer signal that connects the color space conversion processing circuit 302 and the output color correction processing circuit 303 has a width of 16 bits for each color signal, 6 color signals make up the bus, and image data is input to the output color correction processing circuit 303. In a similar fashion, the data transfer signal that connects the output color correction processing circuit 303 and the binarization processing circuit 304 has a width of 16 bits for each color signal, and 6 color signals make up the bus. The output image data of the output color correction processing circuit 303 is input into the binarization processing circuit 304 via this bus.

Figure 4A:
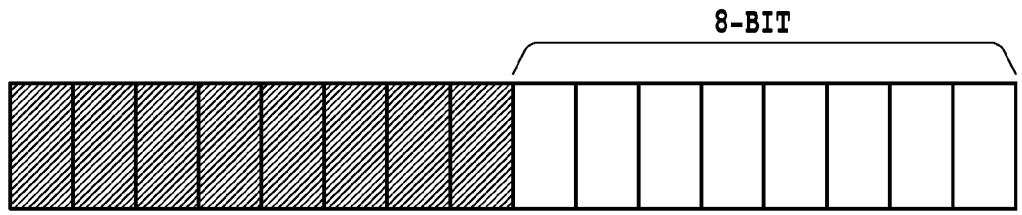
FIGS. 4A to 4D are diagrams that explain the format of the image data input to the output color correction processing circuit shown at FIG. 3.
Figure 4B:
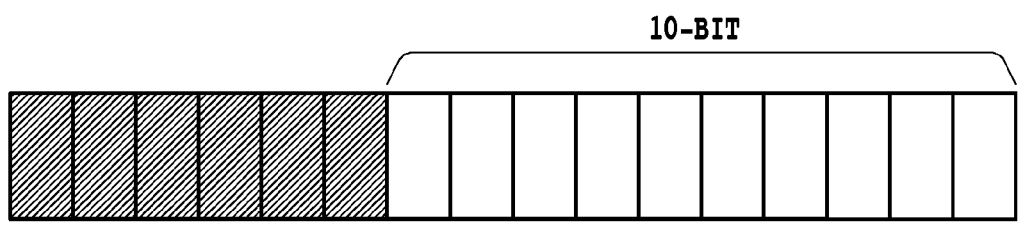
Figure 4C:
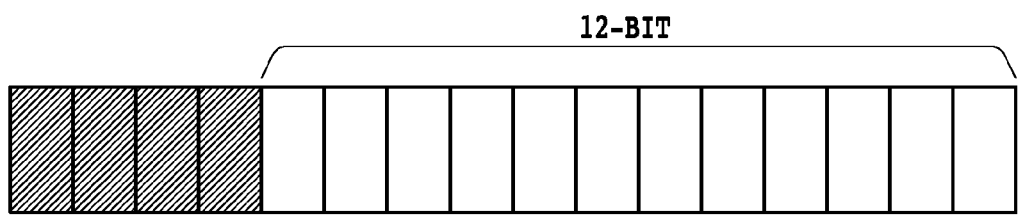
Figure 4D:
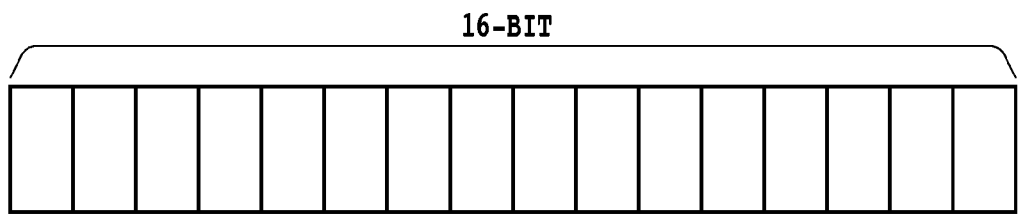

FIGS. 4A to 4D are drawings that explain the format of the image data input to the output color correction processing circuit 303 shown at FIG. 3. The output color correction processing circuit 303 is capable of receiving 8 bit, 10 bit, 12 bit and 16 bit image data, and performing color correction processing to it. In the case where the input data is 8 bit data, as shown at FIG. 4A, processing is carried out using data transmitted from lower 8 bit data of the 16 bit width bus. In the case where the input data is 10 bit data or 12 bit data, as shown respectively at FIGS. 4B and 4C, processing is carried to data transmitted from lower 10 bit and 12 bit data of the 16 bit bus data. In the case where the input data is 16 bit data, as shown at FIG. 4D, all of the 16 bit data at the bus is used.

Figure 5:
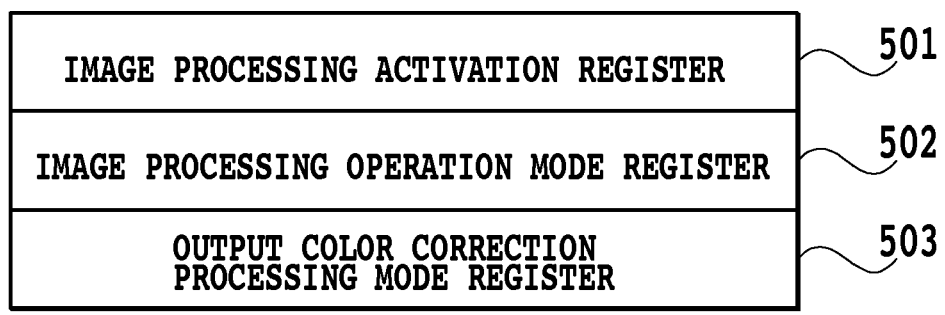
FIG. 5 is a diagram that explains the contents of the register shown at FIG. 3.

FIG. 5 explains the contents of the register 305 shown at FIG. 3. As shown at FIG. 5, the register 305 comprises an image processing activation register 501 for instructing imaging processing to commence, and a register for regulating the operating mode of the image processor 109. The register that regulates the operating mode of the image processor 109 has a image processing activation mode register 502 and a output color correction process mode register 503 that regulates the operating mode of the output color correction processing circuit 303. The register 305 also has an unshown register set that sets the operating mode of the input color correction processing circuit 301 and the binarization processing circuit 304.

Figure 6A:
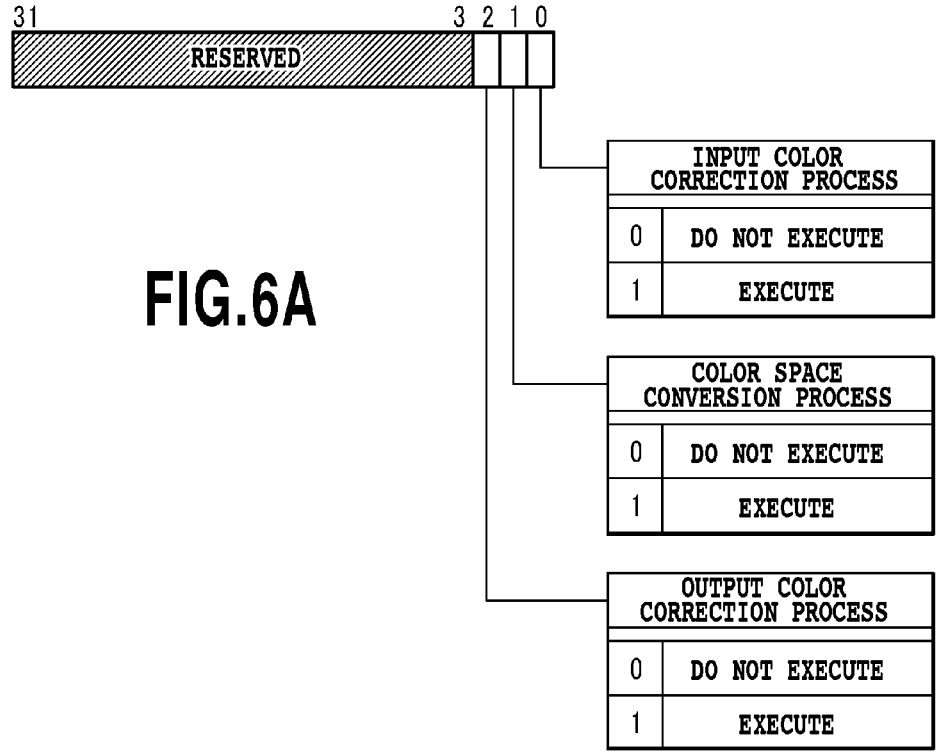
FIGS. 6A and 6B are diagrams for explaining respectively the image processing operation mode register fields and the output color correction processing mode register fields at the register shown at FIG. 5.

The image processing operation mode register 502, as shown at FIG. 6A, has a input color correction processing field that controls the execution of input color correction processing, and a color space conversion process field that controls the execution of the color space conversion process. The image processing operation mode register 502 has a output color correction processing field that controls execution of output color correction processing. In the case where a value of "1" is set in the respective fields, the processes corresponding to those fields are executed, and in the case where a value of "0" is set in the fields, the processes corresponding to the fields are bypassed and the input data is output as is.

Figure 6B:
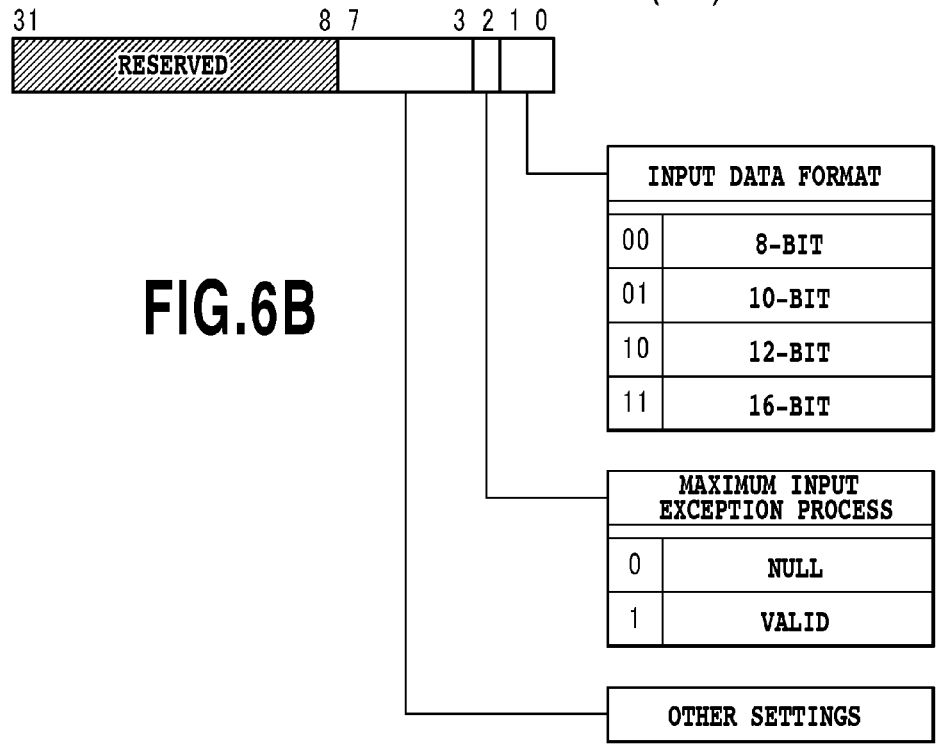
Figure 10:
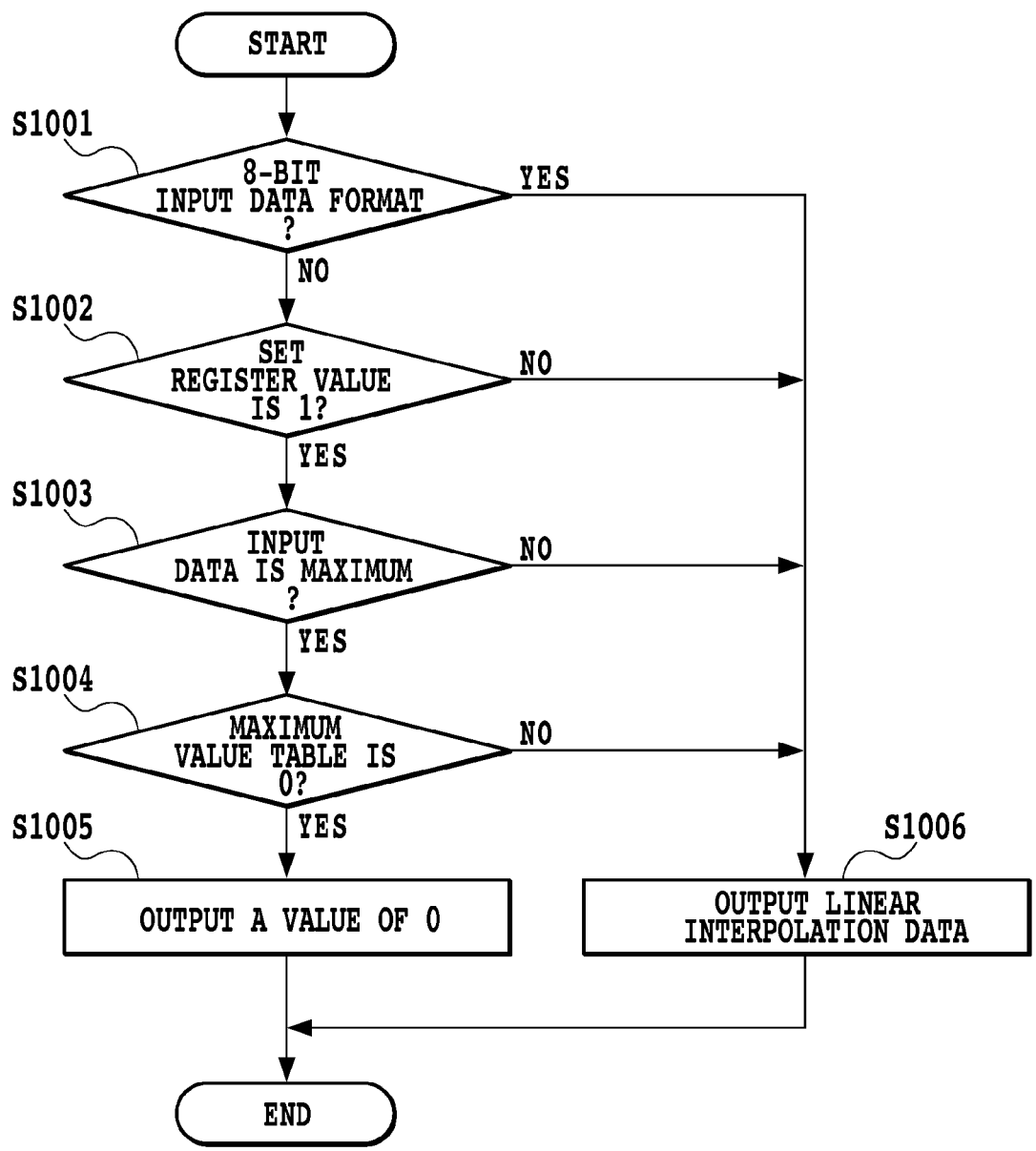
FIG. 10 is a flowchart illustrating the processing sequence of the linear interpolation calculation part of the Embodiment 1 of the invention.

The output color correction processing mode register 503, as shown at FIG. 6B, has a field that regulates the format of the data input into the output color correction processing circuit 303, a field that controls the execution of the later described maximum input exception process, and a field that sets the other operating modes. In the case where a value of "1" is set in the maximum input exception processing field the exception process described later at FIG. 10 is executed.

Figure 7:
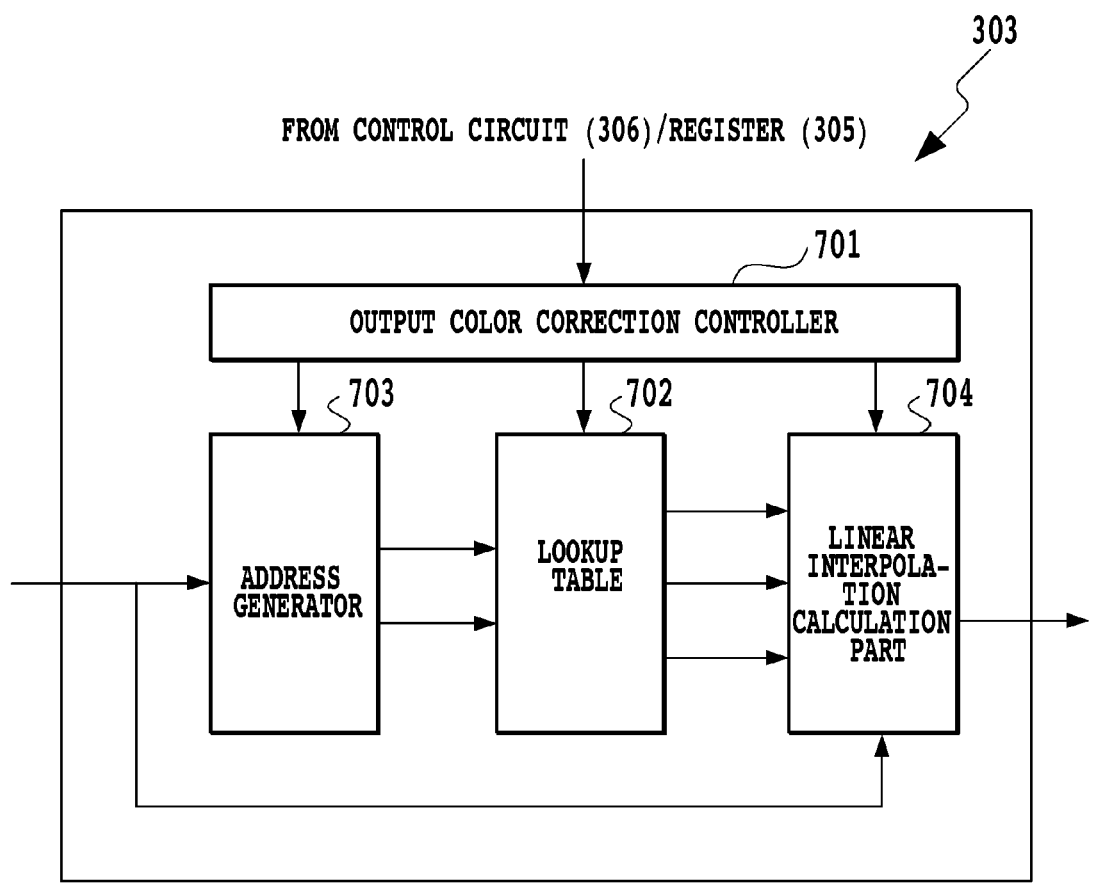
FIG. 7 is a block diagram that illustrates the detailed configuration of the output color correction processing circuit shown at FIG. 3.

FIG. 7 is a block diagram that illustrates the detailed configuration of the output color correction processing circuit 303 shown at FIG. 3. FIG. 7 shows the configuration for performing color correction processing to one color signal, and the configuration shown in the figure is prepared for each color signal. As shown at FIG. 7, the output color correction processing circuit 303 is configured to have an output color correction controller 701, a lookup table 702, and address generator 703, and a linear interpolation calculation part 704.

The output color correction controller 701 controls the output color correction processing circuit 303 by way of operating according to the control of the control circuit 306 based on the setting of the register 305. More concretely, the output color correction controller 701 performs the generation and output of a timing signal for pipeline processes of the elements described below.

Figure 8:
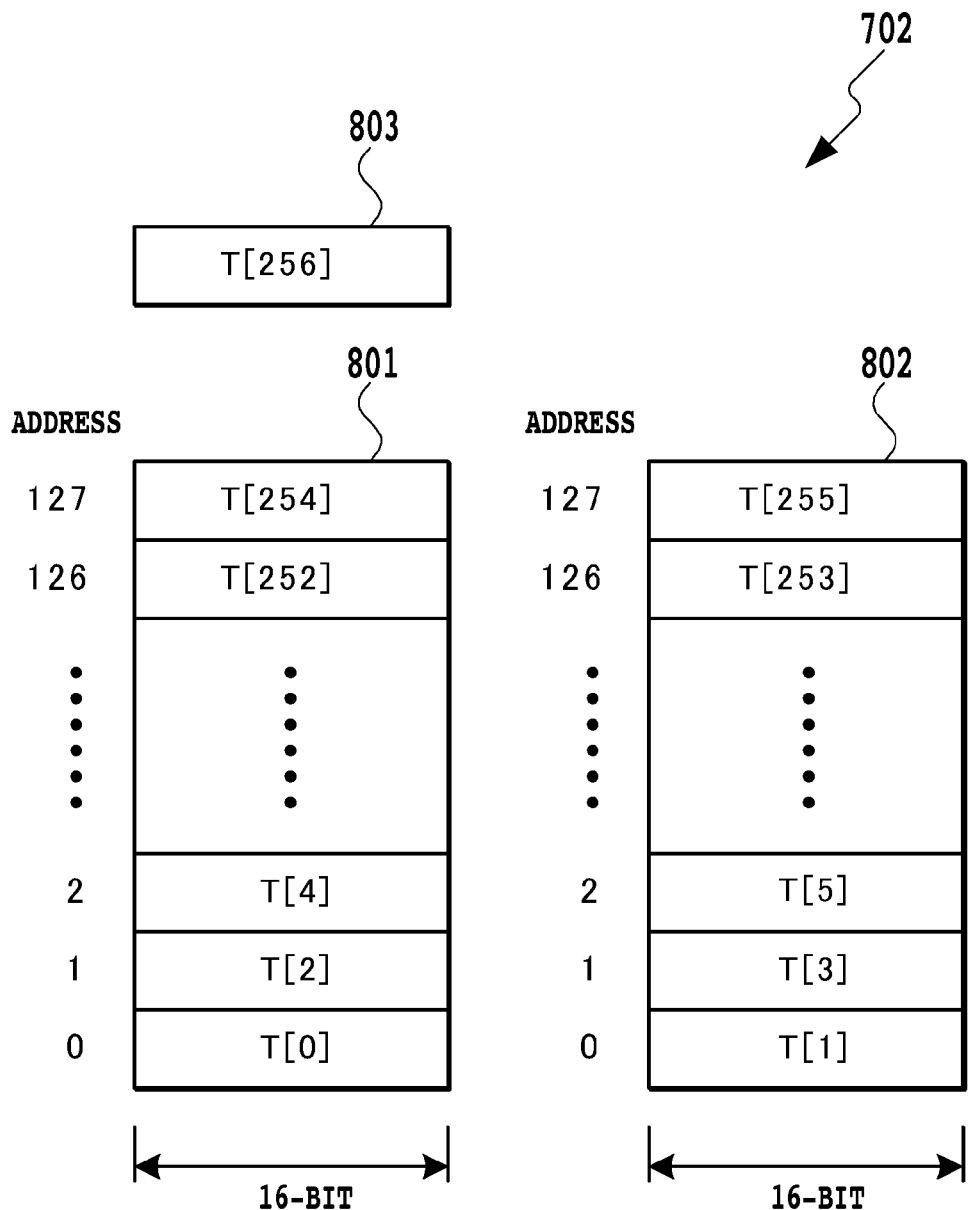
FIG. 8 is a diagram that explains the structure of the lookup table shown at FIG. 7.

The lookup table 702 is configured to store 257 table values, from T[0] to T[256], and these table values are divided into three elements. More specifically, as shown at FIG. 8, the lookup table 702 has an even number table 801 that stores even number table values from T[0] to T[254], an odd number table 802 that stores odd number table values from T[1] to T[255], and a maximum value table 803 that stores the table value T[256]. The even number table 801 and the odd number table 802 both comprise 128 words SRAM, and access blocks are designated by way of a 7 bit address signal. The word length of the SRAM comprising these two tables is 16 bit. An address signal for the even number table 801 and an address signal for the odd number table are input from the address generator 703 into the lookup table 702. The two table values selected by the respective address signals are output to the linear interpolation calculation part 704. The maximum value table 803 that stores the table value T[256] comprises six flip-flops and stores 16 bit data. The maximum value table 803 always outputs the stored table value T[256] to the linear interpolation calculation part 704.

The table values output from the even number table 801 are output to the linear interpolation calculation part 704 as a 16 bit signal, and similarly the table values output from the odd number table 802 are output to the linear interpolation calculation part 704 as 16 bit signal. The maximum table value output from the maximum value table 803 is also output to the linear interpolation calculation part 704 as a 16 bit signal.

The address generator 703 is a circuit that generates an address signal for referencing the lookup table that corresponds to the input image data. That is, from the 16 bit width input data signal, the address generator 703 generates a 7 bit address signal for referencing the even number table 801, and a 7 bit address signal for referencing the odd number table 802. The address generator 703 generates each of the address signals corresponding to the bit number of the input data, according to the value set in the input data format field of the output color correction processing mode register 503.

The linear interpolation calculation part 704 executes a linear interpolation calculation with respect to the table values that is outputted from the lookup table 702 and inputted into the linear interpolation calculation part. More specifically, the linear interpolation calculation part 704 performs a linear interpolation calculation with respect to the value output from the even number table and the value output from the odd numbered table or with respect to the value output from the odd number table and the value output from the maximum value table, and outputs the result of the linear interpolation calculation as 16 bit data. Here, the linear interpolation calculation part 704 executes the linear interpolation calculation according to the value set in the input data format field of the color correction processing mode register 503. By way of combining referencing of the lookup table 702 and interpolation by the linear interpolation calculation part 704 in this manner, it is possible to perform color correction processing at a high speed with respect to all kinds of image data while restraining the amount of the lookup table 702.

FIGS. 9A to 9D are diagrams for explaining the data that is input into the address generator 703 of the output color correction processing circuit 303 and the data that is output as the result of the interpolation of the linear interpolation calculation part 704, in respect to the interpolation calculation. In other words, the interpolation process that is explained via these figures, as described later at FIG. 10, denote the normal interpolation process that is performed outside of the maximum input exception process.

FIG. 9A shows a case that the input data is of an 8-bit data format. In this case, because the number of gradation levels (256) signified by the input data INDATA input into the address generator 703, and the number of table values (256) at the lookup table 702 are the same, the table value T[K] corresponding to the gradation value (multi level value) K based on the input data INDATA is output as is, as the result of the calculation. On the other hand, in the case of a 10 bit input data format, as shown at FIG. 9B, an interpolation calculation is performed with respect to two table values, T[K] and T[K+1], based on the value K denoted by high 8 bit data of the input data INDATA. More specifically, a linear interpolation is performed that executes internal division to the two table values T[K] and T[K+1] based on the internal division ratio according to the value denoted by the low 2 bit data, and the output data is obtained. The case of a 12 bit input data format and a 16 bit input data format are similar to the 10 bit case, and the respective linear interpolation calculations are shown at FIG. 9C and FIG. 9D.

FIG. 10 is a flowchart illustrating the processing sequence of the linear interpolation calculation part 704 of this embodiment.

First, at step 1001, it is determined whether the input data format is an 8-bit data format. In the case where it is an 8-bit data format, the process proceeds to step 1006, and in the case where it is not an 8-bit data format the process proceeds to step 1002. At step 1001, in the case where a value of "00" is in the input data format field of the output color correction processing mode register 503, it is determined that it is an 8-bit data format, and when the value is something other than "00" it is determined that it is not an 8-bit data format.

At step 1002, it is determined if the value set in the maximum input exception process field of the output color correction processing mode register of the register 305 is "1." Here, in the case where the value is set to "1," the process proceeds to step 1003 for executing the maximum input exception process. On the other hand, when a value of "0" is set in the maximum input exception processing field the process proceeds to step 1006. In this embodiment, as a case where "1" is set in the maximum value input exception processing field, there is a case where, as described above, the printing mode is a monochrome mode. This printing mode performs printing of a monochrome image using only black, matte-black, grey and photo-grey among the 12 ink colors. In this case, when the image data indicates a white area that should not be printed, it is possible to avoid the formation of unnecessary dots at the white area.

At step 1003, it is determined if the input data is the maximum value; in the case where it is the maximum value the process proceeds to step 1004, and in the case where it is not the maximum value the process proceeds to step 1006. The maximum value determination is performed for each input data format. That is, in the case where the input data format is a 10 bit format, it is determined if the input value corresponds to "1023." In the same manner, in the case where the input data format is a 12 bit format and the input data corresponds to "4095," and in the case where the input data format is a 16 bit format and the input data corresponds to "65535," it is determined that it is the maximum value.

At step 1004 it is determined if the value T[256] set in the maximum value table 803 is "0." Here, in the case where the maximum value table 803 is "0," the process proceeds to step 1005, and where the maximum value table is not "0" the process proceeds to step 1006. As for the determination of whether the maximum value table 803 is "0," it is possible to make the determination based on the value of the maximum value table 803 input from the lookup table 702 into the linear interpolation calculation part 704.

At step 1005 the value "0" is output as the result of the maximum input exception process. On the other hand, at step 1006, the normal linear interpolation described above at FIG. 9 is performed and the resultant data of that calculation is output.

As described above, by way of executing the interpolation calculation process along with the maximum input exception process described while making reference to FIG. 10, in the case where the value of the maximum value table 803 is "0" and the (color signal of the) image data input into the output color correction processing circuit 303 is at the maximum value, the interpolation calculation is not performed and the exception process is performed.

Figure 11A:
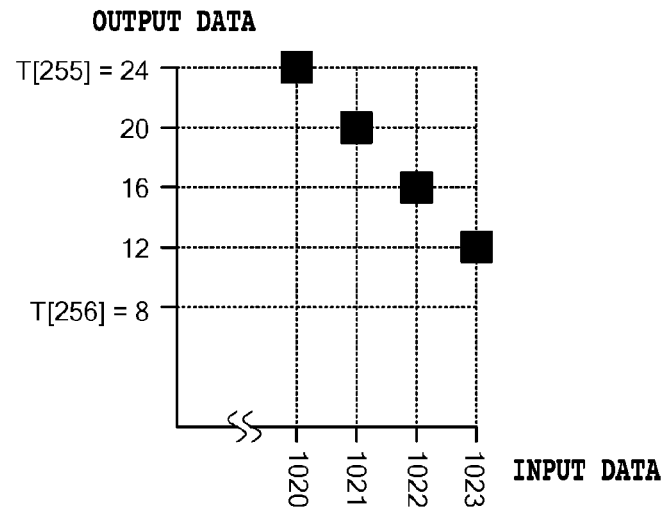
FIGS. 11A and 11B are diagrams that explain, in the case where the input data is in a 10 bit data format, respective examples of the normal interpolation process and the exception process of the Embodiment 1.
Figure 11B:
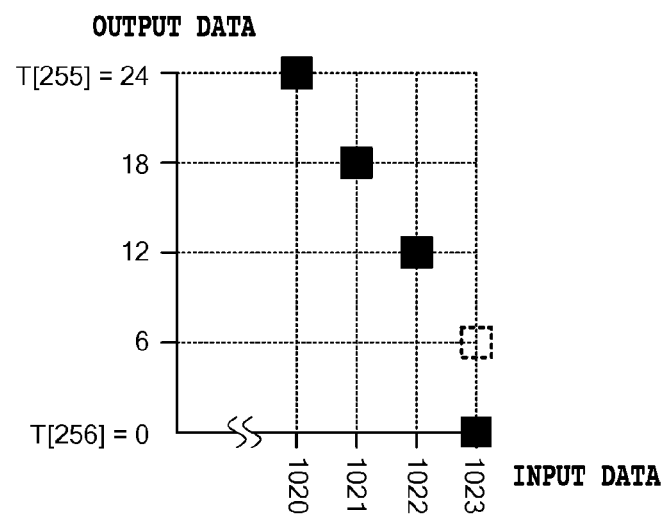

FIGS. 11A and 11B are diagrams that explain, in the case where the input data is in a 10 bit data format, respective examples of the normal interpolation process and the exception process. FIG. 11A is a case where the exception process does not occur and the normal interpolation process is performed, and shows an example where the table value T[255] of the odd number table 802 is "24" and where the table value T[256] of the maximum value table 803 is "8." In this case, when the input data is the maximum value "1023", the result of the linear interpolation calculation, (1*T[255]+3*T[256])/4=12, is output. On the other hand FIG. 11 B is a case where the value T[255] of the odd number table 802 is "24," the same as the example shown at FIG. 11A, but where the value T[256] of the maximum value table 803 is "0." In this case, with a condition that it is determined, at step 1002 of FIG. 10, that the content of the output color correction processing mode register 503 is "1", when the input data is the maximum value "1023", "6" as the result of the linear interpolation calculation is not output but rather a value of "0" is output. Hence, when the image data indicates the white area where an image is not to be printed, it is possible to avoid the formation of unnecessary dots at the white area.

Note that in the case where the input data format is an 8-bit data format, as explained at the process shown at FIG. 10, the normal interpolation process is performed without exception, regardless of the conditions shown at step 1002 and thereafter (step 1006). In this case, as described above at FIG. 9A, without actually performing the interpolation calculation, for example when the input data is at the maximum value, the maximum value is output as is. Thus, in the case where the value T[256] of the maximum table 803 is set to [0], because it is output as is, in the same manner it is possible to avoid the formation of unnecessary dots.

In this embodiment, the linear interpolation calculation shown at FIG. 9 and the process shown at FIG. 10*a* are written with Hardware Description Language (HDL). Here, at the process relating to the linear interpolation calculation of FIG. 9, it is possible to use case statements, depending upon the situation stemming from the input data format. By way of performing a logical synthesis with respect to the description, a logic circuit is created that is capable of executing the above described output color correction processing operations. The logic circuit created by the logical synthesis comprises the output color correction processing circuit of this embodiment. In this case, in this embodiment, it is possible to create a synchronized circuit that simultaneously operates processes with respect to 6 color elements. It is also possible to configure and describe a state machine with respect to the process shown at FIG. 10, and to create a circuit that sequentially processes each color signal.

Embodiment 2

In the Embodiment 1 described above, a printing apparatus is described that, in the case where the data input into the output color correction processing circuit is at the maximum value, the value at the maximum value table T[256] is "0," and outputs "0" as the result of the output color correction process. In the case where the value at the maximum value table T[256] is the maximum and where the data input into the output color correction processing circuit is at the maximum value, the apparatus may also be configured such as to output the maximum value as the output color correction result. This configuration will be described below as Embodiment 2. Note that because the configuration of the printing apparatus of the Embodiment 2 and the configuration of the image processor are the same as that of FIG. 2 and FIG. 3 relating to the Embodiment 1 described above, explanation will be made while making use of the same figures.

Figure 12:
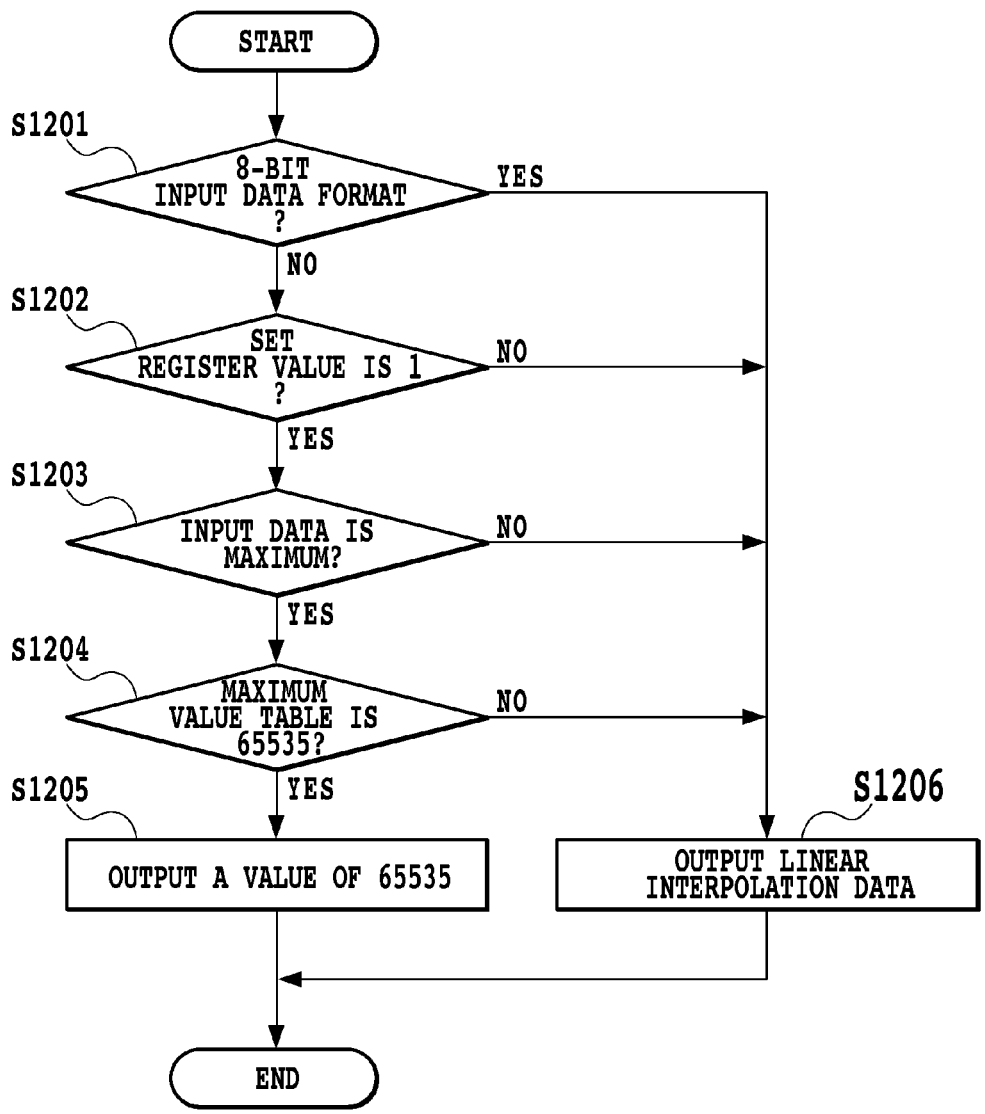
FIG. 12 is a flowchart illustrating the processing sequence of the linear interpolation calculation part of the printing apparatus of Embodiment 2 of the invention.

FIG. 12 is a flowchart illustrating the processing sequence of the linear interpolation calculation part 704 of the printing apparatus 100 of the Embodiment 2. The linear interpolation calculation part 704 executes a process according to the flowchart of FIG. 12 each time data is entered.

At FIG. 12, steps 1201 to 1203, and step 1206 execute processes that are respectively the same as steps 1001 to 1003, and step 1006 of FIG. 10, relating to the Embodiment 1.

In the Embodiment 2, at step 1204 it is determined whether the value of the table value T[256] of the maximum value table 803 is the maximum value; in the case where it is the maximum value the process proceeds to step 1205 and where the value of the maximum value table 803 is not the maximum value the process proceeds to step 1206. When, at the printing apparatus 100 of the Embodiment 2, the table value T[256] of the maximum value table 803 is 16-bit data, and the set value corresponds to "65535," it is determined that the maximum value has been set. Next, at step 1205, the maximum value is output. The output data of the output color correction processing circuit 303 is 16-bit data, and at step 1205 "65535" is output as the maximum value.

By way of executing the processes shown at FIG. 12, as described above, in the case where the value of the maximum value table 803 is the maximum "65535," and the input data is at the maximum, a linear interpolation exception process is carried out.

Figure 13A:
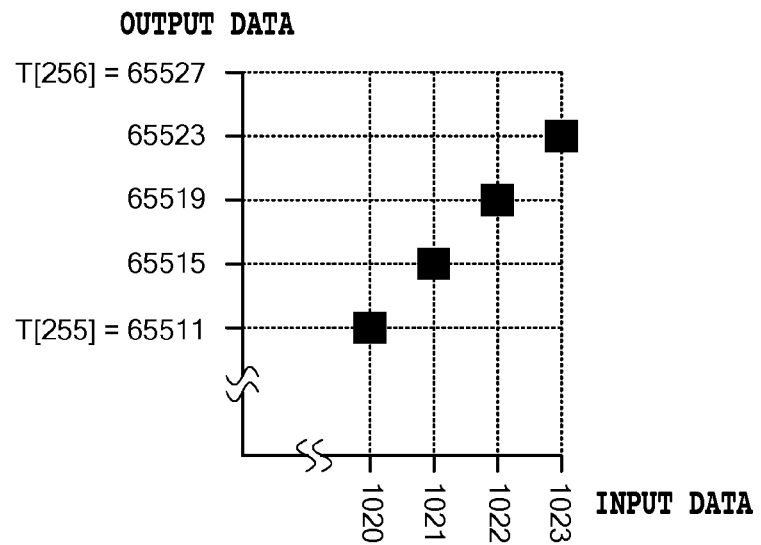
FIGS. 13A and 13B are diagrams that explain, in the case where the input data is in a 10 bit data format, respective examples of the normal interpolation process and the exception process of the Embodiment 2.
Figure 13B:
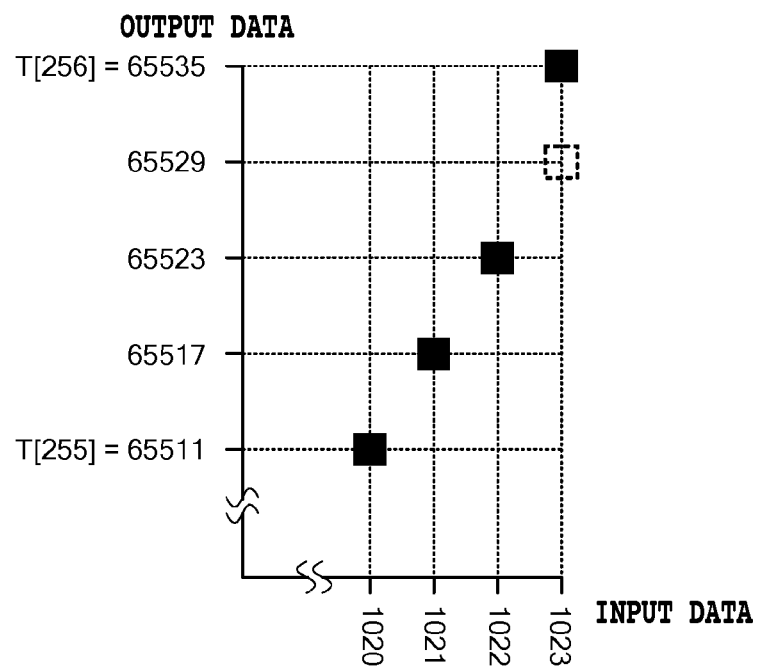

FIGS. 13A and 13B are diagrams that explain, in the case where the input data is in a 10 bit data format, respective examples of the normal interpolation process and the exception process. The case shown at FIG. 13A, at which the normal interpolation process is performed, is a case where the table value T[255] of the odd number table 802 is "65511" and where the table value T[256] of the maximum value table 803 is "65527." In this case, because the value of the maximum value table 803 is not at the maximum, even though the input data is at the maximum of "1023," the result of the linear interpolation calculation, (1*T[255]+3*T[256])/4=65523, is output.

On the other hand, the case shown at FIG. 13B, which shows the exception process, is a case where the table value T[255] of the odd number table 802 is "65511," the same as that of FIG. 13A, but where the table value T[256] of the maximum value table T[256] is "65535." In this case, when the input data is the maximum value "1023", (1*T[255]+3*T[256])/4=65529 that is the result of the linear interpolation calculation is not output, but rather the maximum value "65535" is output.

As for the Embodiment 2, by way of writing the process shown at FIG. 12 with Hardware Description Language and performing a logical synthesis, it is possible to create a logic circuit that is capable of executing the above described output color correction processing operations. The logic circuit created by the logical synthesis comprises the output color correction processing circuit of this embodiment. In this case, it is possible to create a synchronized circuit that simultaneously operates processing with respect to 6 color signals. It is also possible to configure and describe a state machine with respect to the process shown at FIG. 12, and to create a circuit that sequentially processes each color element.

Note that in the Embodiment 2 a case was described where the maximum value is output in the case where the value of the maximum value table T[256] is at the maximum and where the input data is at the maximum. However, the Embodiment 2 may also be a case where a specified value set in the maximum value table T[256] is output, in the case where the maximum value table T[256] is a specified value and where the input data is at the maximum. In this case, in the case of establishing a specified value in the register, the maximum value table T[256] matches the value set in the specified value register, and the input data is at the maximum, it is possible to execute a process that outputs the applicable specified value set in the specified value register.

Embodiment 3

At the Embodiment 2 a printing apparatus is described in which the output correction processing circuit outputs a specified value in the case where a specified value is established in the maximum value table T[256] and where the input data is at the maximum value. The present invention may also take a form where the output color correction processing circuit selectively outputs one piece of data from among the respective calculated results resulting from a plurality of linear interpolation methods. Embodiment 3 will be described below, for the case of executing linear interpolation calculations based on a plurality of linear interpolation methods. Note that because the configuration of the printing apparatus of the Embodiment 3 and the configuration of the image processor are the same as that of FIG. 2 and FIG. 3 relating to the Embodiment 1 described above, explanation will be made while making use of the same figures. Note also that the printing apparatus 100 of the Embodiment 3 is provided with a facility that executes the linear interpolation calculation shown at FIG. 9 and relating to the above described Embodiment 1 (hereinafter referred to as the "first linear interpolation calculation").

FIGS. 14A to 14D are diagrams that explain a second linear interpolation calculation of the Embodiment 3, which is different than the above described first linear interpolation calculation. The second linear interpolation calculation is also executed by the linear interpolation calculation part 704.

FIG. 14A shows a case of an 8-bit input data format, and in this case the particulars of the linear interpolation calculation are the same as that of the first linear interpolation calculation shown at FIG. 9A.

In contrast, as shown at FIG. 14B, in the case of a 10-bit input data format, the internal division ratio differs from that of the first linear interpolation calculation shown at FIG. 9A. That is, an interpolation result is output that is a value different from that of the first linear interpolation calculation, according to the difference of the internal division ratios. The case of a 12 bit input data format and a 16 bit input data format, as shown at FIGS. 14C and 14D, similarly perform linear interpolation calculations in which the internal division ratios are different from the internal division ratios of the first linear interpolation calculations respectively shown at FIGS. 9C and 9D.

Figure 15:
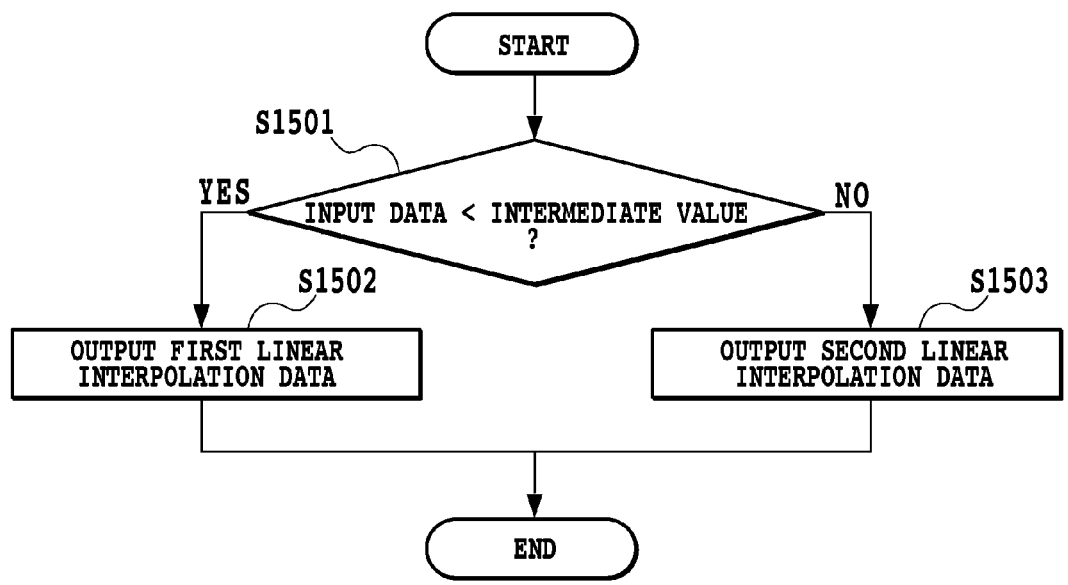
FIG. 15 is a flowchart that illustrates the process of the linear interpolation calculation part of the Embodiment 3.

FIG. 15 is a flowchart that illustrates the process of the linear interpolation calculation part 704 according to the Embodiment 3.

At step 1501 it is determined if the input data is smaller than an intermediate value. Here, if the input image data is smaller than the intermediate value the process proceeds to step 1502, and in the case where the input data is equal to or greater than the intermediate value the process proceeds to step 1503. The intermediate value differs depending on the input data format; it is "128" in the case where the input data format is 8 bit data and it is "512" in the case where the input data format is 10 bit data. In the case where the input data format is 12 bit data the intermediate value is "2048" and in the case where the input data format is 16 bit data the intermediate value is "32767."

When the input value is smaller than the intermediate value, at step 1502 data generated by the first linear interpolation calculation is output and the process is brought to a close. That is, in the case where the signal value of the input image data is smaller than the intermediate value, the result of the first interpolation calculation shown at FIG. 9, relating to the Embodiment 1, is output.

On the other hand, when the input value is equal to or greater than the intermediate value, at step 1503 data generated by the second linear interpolation calculation shown at FIG. 14 is output and the process is brought to a close.

Figure 16A:
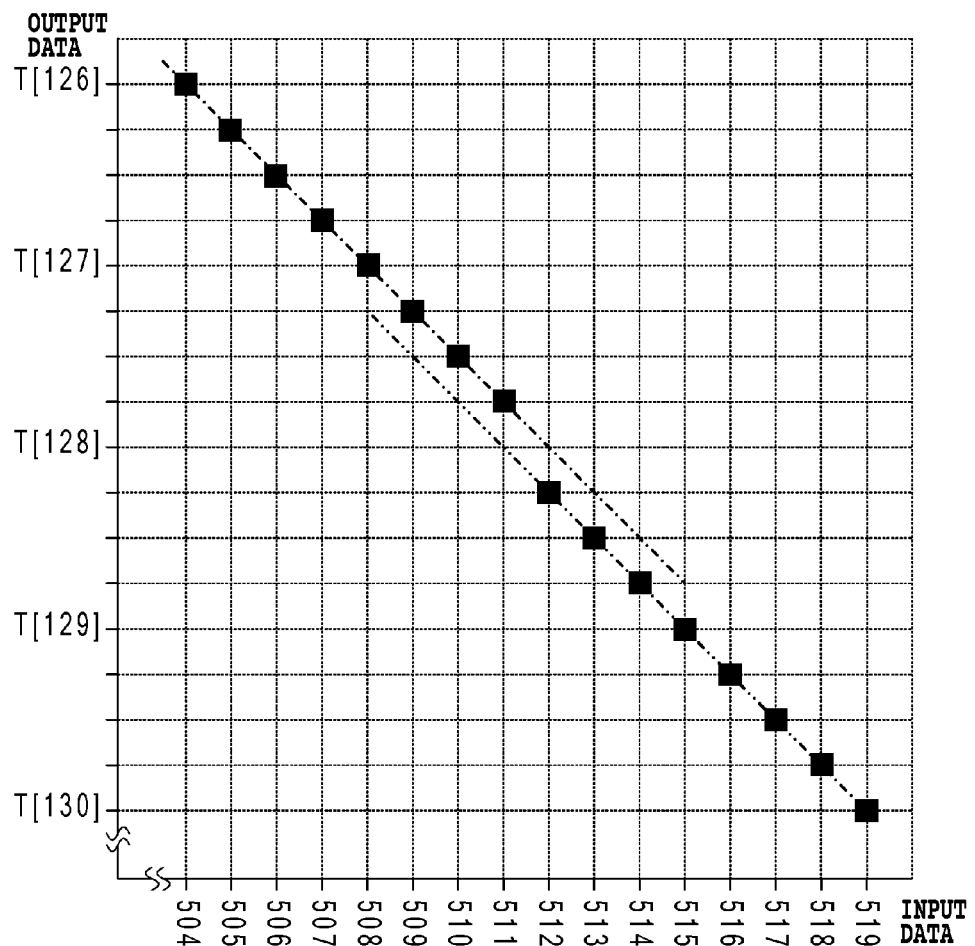
FIGS. 16A and 16B are diagrams that explain, in the case where the input image data is in a 10 bit data format, one example of the Embodiment 3 wherein two linear interpolation calculations are selectively applied.
Figure 16B:
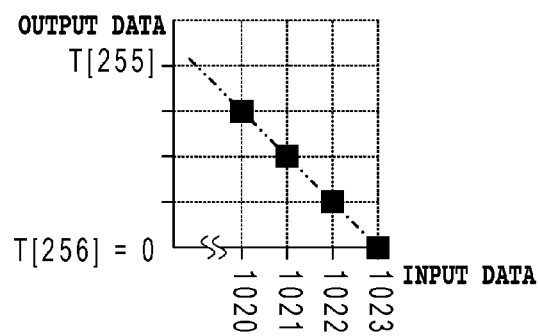

FIGS. 16A and 16B are diagrams that explain, in the case where the input image data is in a 10 bit data format, one example of a case where two linear interpolation calculations are selectively applied. FIG. 16A illustrates the relationship between input data and output data in the case where a signal value in the range of "512," the intermediate value for 10 bit data, has been input. It can be understood from the same figure that the linear interpolation calculation (first linear interpolation calculation) with respect to input data equal to below "511" is different than the linear interpolation calculation (second interpolation calculation) with respect to input data equal to or greater than "512". FIG. 16B illustrates the relationship between input data and output data in the case where a signal value in the range of "1023," the maximum value for 10 bit data, has been input. In this case, when the maximum value of "1023" is input as the input data, because this value is greater than the intermediate value of "512," the second linear interpolation calculation is performed. That is, in the case of the maximum value "1023," values of K=255 and R=3 are obtained according to the "input data" equation of FIG. 14B. Thus, according to the "output data" equation of the same figure, ((3−3)*T[255]+(1+3)*T[255+1])/4=T[256], that is, the maximum value table T[256], is output as the output value. In this case, in particular when a value of "0" is stored as the maximum value table T[256], it becomes possible to output a value of "0" with respect the input of the maximum value "1023."

As for the Embodiment 3, it is possible to write the linear interpolation calculation shown at FIG. 14 and the process shown at FIG. 16 in Hardware Description Language. Here, at the linear interpolation calculation process of FIG. 14, it is possible to use case statements, depending upon the situation stemming from the input data format. By way of performing a logical synthesis with respect to this description, a logic circuit is created that is capable of executing the above described output color correction processing operations. The logic circuit created by the logical synthesis comprises the output color correction processing circuit of the Embodiment 3. In this case, it is possible to create a synchronized circuit that simultaneously operates processing with respect to 6 color elements. It is also possible to configure and describe a state machine with respect to the process shown at FIG. 16, and to create a circuit that sequentially processes each color element.

Note that the Embodiment 3 describes a case of determining whether to apply the first linear interpolation calculation or the second interpolation calculation according to a magnitude relation between the input data and the intermediate value. However, the present invention may also be a case where the linear interpolation calculation is determined based upon a specified value other than the intermediate value. In this case, a specified reference value is established in the register and the specified reference value is set in the applicable specified reference value register. It is possible to configure the printing apparatus such that a process is executed wherein in the case where the input data is smaller than the specified reference value the first linear interpolation calculation is applied, and in the case where the input data is equal to or higher than the specified reference value the second linear interpolation calculation is applied.

Note that the above embodiments may be combined as appropriate. Note also that while each of the above embodiments were described with respect to an exception process to the color correction process in the case where the maximum value of the image data was input, it is possible to perform the same exception process with respect to a color correction in the case where the minimum value relating to the color signal of the image data has been input, that is, when the minimum table value corresponding to the minimum value of the input color signal is a specified value, it is possible to perform a process that outputs that specified value without performing an interpolation calculation.

Each of the above embodiments has been described with respect to a case where the output color correction processing circuit executes an exception process to the color correction process carried out by a linear interpolation method. However, the input color correction processing circuit may also similarly execute an exception process to the color correction process.

Each of the above embodiments are described with respect to a case where the CPU and each of the circuit blocks were configured as a System LSI encapsulated as a single package. However, a portion of the circuit blocks or all of the circuit blocks may each be configured as separate integrated circuits, etc.

At each of the above embodiment a case was described where a logical circuit was created by logical synthesis of content written by Hardware Description Language and where quantization processing is executed by those logic circuits, however, the same processes may be executed by other methods. Quantization processing may also be performed by way of providing the apparatus with a storage medium that stores the software programs that execute the functions of the above described embodiments, and by having that apparatus or CPU of a computer read out and execute the programs stored in the storage medium. Here, the present invention is not limited to executing the applicable programs with a single CPU; processing may be performed via multiple CPUs acting in tandem. The present invention is not limited to an apparatus that executes the above processes by using only hardware or by using only by software; the invention may also comprise an apparatus that executes the above processes via a combination of processes executed by hardware and processes executed by software.

In addition to executing the processes inside the printing apparatus as described above at each of the embodiments, the same processes may also be performed at the host device.

Printing methods other than the ink jet printing method above described may be employed as the printing method when printing an image on the print medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-000629, filed Jan. 5, 2011, which is hereby incorporated by reference herein in its entirety.

What is claimed is:

1. An image processing apparatus, comprising:
an interpolation unit configured to perform an interpolation calculation to two color correction values that are obtained by referencing a lookup table according to a color signal of an input image data to obtain the color correction value of the color signal of the input image data;
a first determination unit configured to determine whether or not the color signal of the input image data is the maximum or the minimum of the value that the color signal takes;
a second determination unit configured to determine whether or not a value corresponding to the maximum or the minimum of the value in the lookup table is a specified value in a case where the first determination unit determines that the color signal of the input image data is the maximum or the minimum; and
an output unit configured to output the color correction value obtained by referencing the lookup table and the color correction value obtained by the interpolation calculation by said interpolation unit,
wherein the output unit outputs the specified value as the color correction value without performance of the interpolation calculation by the interpolation calculation unit, in the case that it is determined by the second determination unit that the value corresponding to the maximum or the minimum of the color signal of the input image data in the lookup table is the specified value.

2. An image processing apparatus according to claim 1, wherein the specified value output by said output unit is zero.

3. An image processing apparatus according to claim 1, wherein the specified value output by the output unit is the maximum of the values that multi level values of the image data take.

4. An image processing apparatus according to claim 1, wherein:
said interpolation unit performs a first linear interpolation calculation and a second linear interpolation calculation that have different internal division ratios from each other; and
said output unit outputs the result of the first linear interpolation calculation as the color correction value when the value of the color signal of the input image data is smaller than a reference value and outputs the result of the second linear interpolation calculation as the color correction value when the value of the input image data color signal is equal to or greater than the reference value.

5. An image processing method, comprising the steps of:
obtaining a color correction value of a color signal of an input image data by referencing a lookup table according to the color signal;
obtaining a color correction value of the color signal by performing an interpolation calculation to two color correction values obtained by referencing the lookup table;
determining whether or not the color signal of the input image data is the maximum or the minimum of the value that the color signal takes;
determining whether or not a value corresponding to the maximum or the minimum of the value in the lookup table is a specified value in a case where it is determined the color signal of the input image data is the maximum or the minimum; and
outputting the specified value as the color correction value without performance of the interpolation calculation in the case that it is determined that the value corresponding to the maximum or the minimum of color signal of the input image data in the lookup table is the specified value.

6. A storage medium that is capable of being read by a computer and in which a program is stored that have program codes for causing the computer to execute the image processing method according to claim 5.

7. An image processing method according to claim 5, wherein the specified value output in the outputting step is zero.

8. An image processing method according to claim 5, wherein the specified value output in the outputting step is the maximum of the values that multi level values of the image data take.

9. An image processing method according to claim 5, wherein performing the interpolation calculation comprises performing a first linear interpolation calculation and a second linear interpolation calculation that have different internal division ratios from each other; and
wherein the outputting step comprises outputting the result of the first linear interpolation calculation as the color correction value when the value of the color signal of the input image data is smaller than a reference value and outputting the result of the second linear interpolation calculation as the color correction value when the value of the input image data color signal is equal to or greater than the reference value.

* * * * *